United States Patent
Fuse

(10) Patent No.: US 8,284,762 B2
(45) Date of Patent: Oct. 9, 2012

(54) TELEPHONE SYSTEM

(75) Inventor: Tamikazu Fuse, Atsugi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1128 days.

(21) Appl. No.: 11/839,760

(22) Filed: Aug. 16, 2007

(65) Prior Publication Data

US 2008/0123631 A1 May 29, 2008

(30) Foreign Application Priority Data

Nov. 29, 2006 (JP) .................................. 2006-321909

(51) Int. Cl.
*H04L 12/66* (2006.01)

(52) U.S. Cl. ......... 370/352; 370/401; 379/225; 379/227

(58) Field of Classification Search .......... 370/352–357, 370/360, 389, 392, 401, 395.2, 395.3, 395.5; 379/225, 227, 229, 231, 220.01, 221.08, 379/262
See application file for complete search history.

(56) References Cited

U.S. PATENT DOCUMENTS

| | | | |
|---|---|---|---|
| 2004/0179670 A1* | 9/2004 | Handa ...................... | 379/265.02 |
| 2006/0188077 A1* | 8/2006 | Susen et al. .............. | 379/114.01 |
| 2006/0215638 A1* | 9/2006 | Abe ............................. | 370/352 |
| 2008/0187123 A1* | 8/2008 | Abramson et al. ....... | 379/220.01 |
| 2008/0187124 A1* | 8/2008 | Abramson et al. ....... | 379/220.01 |
| 2008/0187126 A1* | 8/2008 | Abramson et al. ........... | 379/225 |

FOREIGN PATENT DOCUMENTS

| | | |
|---|---|---|
| EP | 1761011 A1 | 3/2007 |
| JP | 10303915 | 11/1998 |
| JP | 2004064225 | 2/2004 |
| JP | 2004235922 | 8/2004 |
| JP | 2004320629 | 11/2004 |
| WO | 0135602 A1 | 5/2001 |
| WO | 0137529 A1 | 5/2001 |

* cited by examiner

*Primary Examiner* — Hassan Phillips
*Assistant Examiner* — Ajay Cattungal
(74) *Attorney, Agent, or Firm* — Pillsbury Winthrop Shaw Pittman, LLP

(57) ABSTRACT

According to one embodiment, there is provided a telephone system including; a plurality of exchanges interconnecting a plurality of communication terminals through a communication network, each exchange receiving from each communication terminal a connection request including an extension number of each communication terminal, based on authentication processing and including; a management data base where the extension number is correlated with an address information of a prescribed exchange; an acquisition processing unit retrieving the management data base based on the extension number when the connection request is received from the communication terminal and acquiring the address information; and a notification processing unit notifying the communication terminal of the address information of the acquired prescribed exchange. Each communication terminal comprises a reconnection request processing unit transmits the connection request to the address information of the prescribed exchange when the address information of the prescribed exchange is notified from the exchange.

12 Claims, 5 Drawing Sheets

| EXTENSION NUMBER | NODE ID |
|---|---|
| 400 | 10 |
| 401 | 10 |
| ⋮ | ⋮ |
| 603 | 30 |

| NODE ID | IP ADDRESS |
|---|---|
| 10 | 172.16.3.1 |
| 30 | 172.16.3.8 |

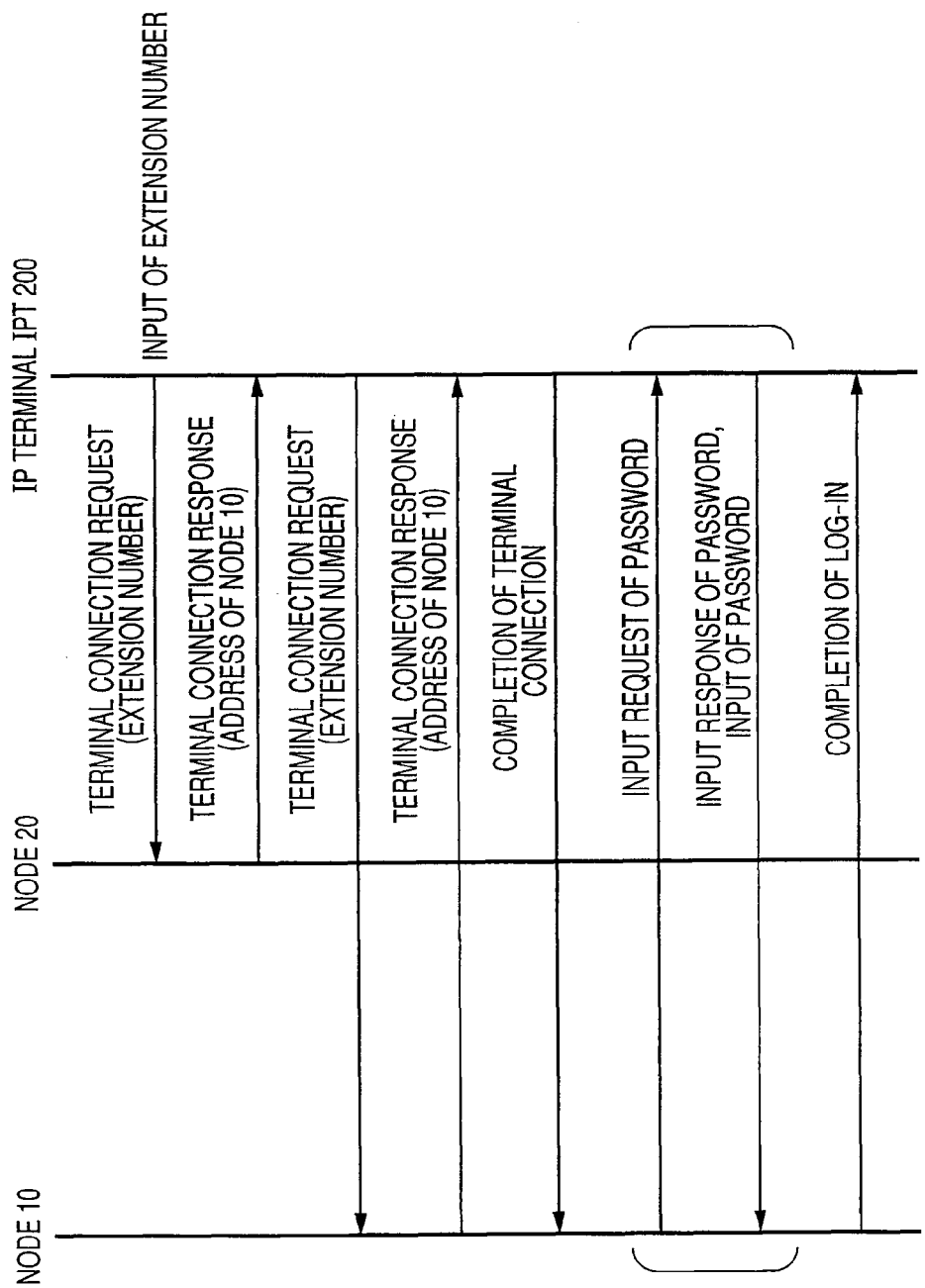

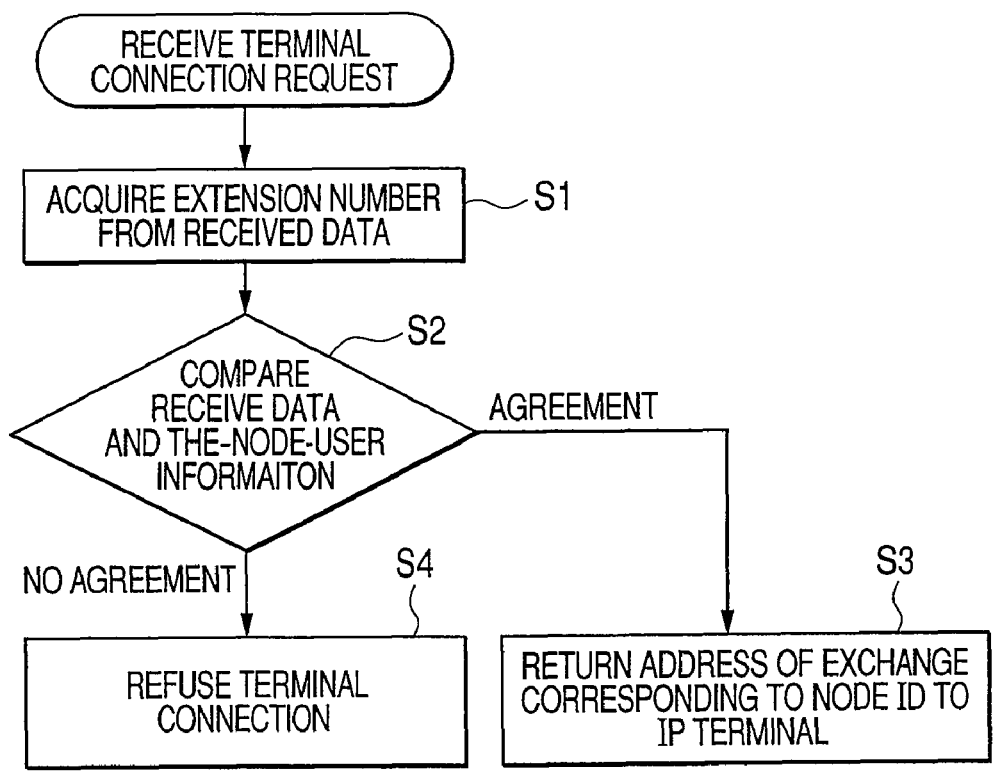

TELEPHONE SYSTEM

CROSS-REFERENCE TO RELATED APPLICATIONS

This application is based upon and claims the benefit of priority from Japanese Patent Application 2006-321909, filed on Nov. 29, 2006, the entire contents of which are incorporated herein by reference.

BACKGROUND

1. Field

One embodiment of the invention relates to a telephone system using e.g. IP (Internet Protocol) technology.

2. Description of the Related Art

A well-known system communicates audio information through a best-effort type communication network such as the internet. This kind of system is called an IP telephone system or VoIP (Voice over IP) and applied to a local communication network such as a local telephone network as well as a wide-area telephone network. In the following description, the telephone terminal in such a kind of system is referred to as an IP terminal inclusive of a fixed telephone and a softphone.

Mostly, the IP telephone system has a function capable of authenticating an individual telephone. A typical example of such a terminal authentication function is a registration operation using an SIP (Session Initiation Protocol). This function enhances the independency of the IP telephone so that the IP telephone can be easily moved within the network. Namely, irrespectively of the installation position, the IP terminal having logged in the system can be employed by freely calling up the setting of a user himself and personal telephone directory.

In order to apply the SIP to the system, in many cases, a means of mounting the SIP is adopted in a dedicated server. However, since the SIP is a right protocol, mounting the SIP in an indispensable resource such as an exchange permits system cost to be reduced more greatly. Such an embodiment is widely adopted.

However, in the above-described related-art, the IP terminal can log in only the exchange to which the IP terminal is belonged. Namely, in a system where a plurality of exchanges each including a plurality of IP terminals are interconnected to one another through the network, the log-in/out function can be realized only within a small network closed for each exchange. Thus, it is inconvenient that the user cannot log in the system when the user moves from one small network to another small network.

It is disclosed by, for example, JP-A-2004-64225 that a management server for managing the relationship between node (exchange) information and address information is indispensable, so that cost of the system will be increased, since following procedures is required when the user logs in the system. Once the IP telephone is connected to the management server when the user logs in the system, the exchange of the other side is to be designated by inputting the node information, so that the user is forced to input the server information and the node information.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is an exemplary sequence diagram showing the log-in processing procedure in the system shown in FIG. 1;

FIG. 7 is an exemplary flowchart showing the determining procedure in the exchange of the connection node for an IP terminal of a connection request source; and FIG. 8 is a table showing an example of the other-node-user information data base.

DETAILED DESCRIPTION

Various embodiments according to the invention will be described hereinafter with reference to the accompanying drawings. In general, according to one embodiment of the invention, there is provided a telephone system including; a plurality of exchanges interconnecting a plurality of communication terminals to one another through a communication network, each exchange receiving from each communication terminal a connection request including an extension number of each communication terminal, based on authentication processing and including; a management data base in which the extension number is correlated with an address information of a prescribed exchange; an acquisition processing unit retrieving the management data base based on the extension number when the connection request is received from the communication terminal and acquiring the address information of the prescribe exchange; and a notification processing unit notifying the communication terminal of the address information of the prescribed exchange acquired by the acquisition processing unit. Each communication terminal includes a re-connection request processing unit that transmits the connection request to the address information of the prescribed exchange when the address information of the prescribed exchange is notified from the exchange.

Figure 1:
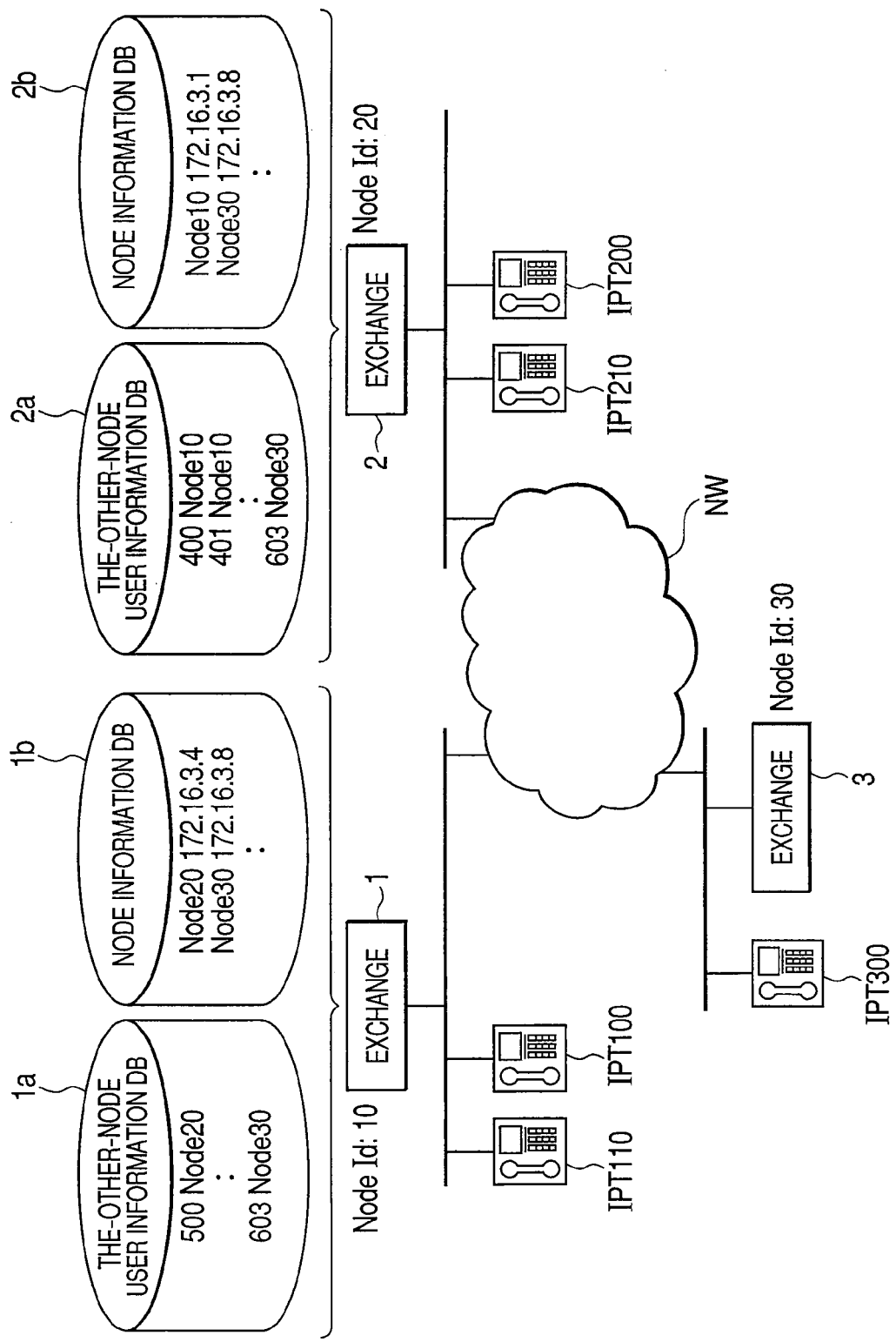
FIG. 1 is an exemplary system diagram showing a telephone system according to an embodiment of the invention.

According to an embodiment, FIG. 1 shows an exemplary system diagram showing a telephone system according an embodiment.

The system includes a plurality of exchanges 1 to 3 which are interconnected to one another through an IP network NW. The exchanges 1 to 3 communicate with one another via the IP network NW serving as a private network, not through a public network.

IP terminals (IPTs) each serving as a communication terminal are connected to each exchange. IPTs 100, 110 are connected to the exchange 1; IPTs 200, 210 are connected to the exchange 2; and IPT 300 is connected to the exchange 3. These IPTs are physically connected to the exchanges though a small network such as LAN (Local Area Network), respectively.

In this state, each IPT can be employed as an ordinary telephone. Namely, each IPT is also logically connected to the corresponding exchange. The respective IPTs can internally communicate to one another through the IP network NW. Further, in each IPT, in such a manner that a user executes a log-in procedure, the using format making the best use of user's settings can be realized. Each exchange 1 to 3 executes the log-in procedure according to the connecting request from the IPT, and when the authentication has been established, permits the IPT of a request source to be connected in the log-in state.

Each exchange 1 to 3 includes an other-node-user information data base (DB) and a node information data base (DB). It is assumed that the data bases of the exchange 1 are denoted by reference symbols 1a, 1b, respectively and the data bases of the exchange 2 are denoted by reference symbols 2a, 2b, respectively. Although not shown, the exchange 3 also has the similar data bases.

Figures 2, 3, 4:
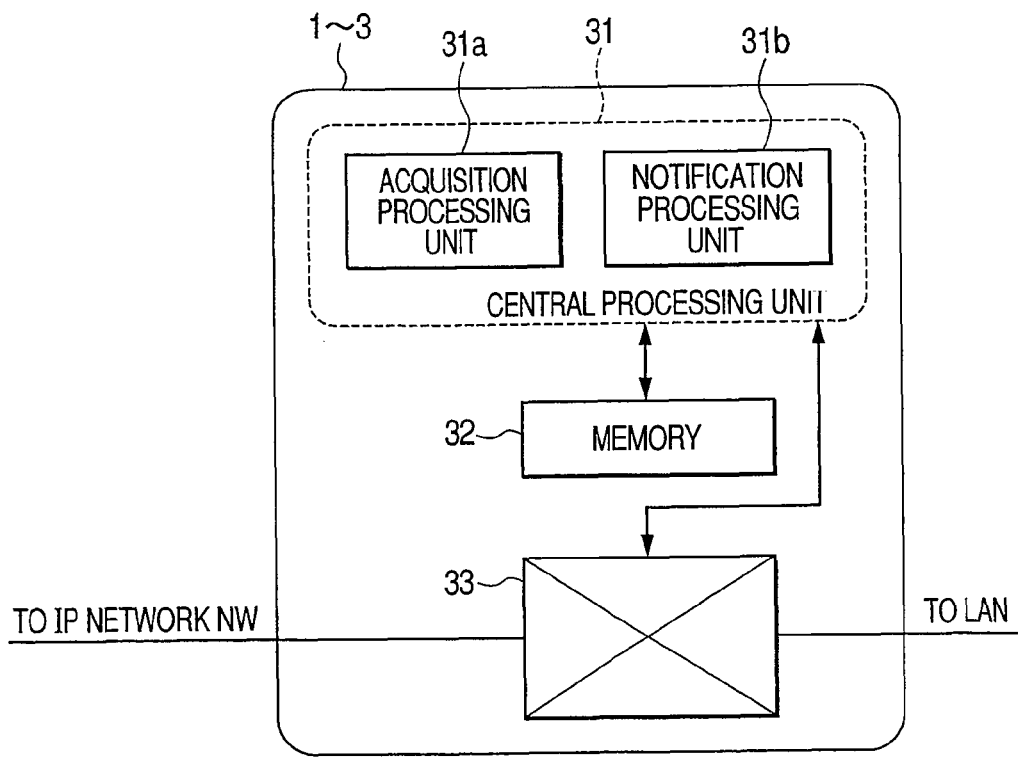
FIG. 2 is an exemplary table showing an example of the other-node-user information data base (DB) in FIG. 1.
FIG. 3 is an exemplary table showing an example of the node information data base (DB) in FIG. 1.
FIG. 4 is an exemplary function block diagram showing the exchange 1 to 3 in FIG. 1.

As shown in FIG. 2, the other-node-user information data base (DB) is a data base in which the extension number of the IP terminal is correlated with the identifier of the exchange which is a prescribed connecting party of this IP terminal. Namely, the other-node-user information data base holds the extension numbers of users and indicates the node under which these extension numbers are placed (or, to which these extension numbers belong). As the identifier, for example, a node ID, i.e. the identifying number as a node of each exchange is employed. The exchange 1 is Node 10; the exchange 2 is Node 20; and the exchange 3 is Node 30.

As shown in FIG. 3, the node information data base is a data base in which each exchange within the system is correlated with the IP address. For example, the IP address of the exchange 1 (Node 10) is 172.16.3.1. By using both data bases, for each IP terminal, it is possible to manage its extension number and the IP address of the exchange at the prescribed connecting party in their correlated manner.

FIG. 4 is a function block diagram showing the exchange 1 to 3 in FIG. 1. The exchange 1 to 3 includes a central processing unit 31, a memory 32 and an exchange processing unit 33. The exchange processing unit 33 is connected to the IP network NW and LAN and executes various kinds of arrival processing (group arrival, transfer, etc.) under the control by the central processing unit 31. The memory 32 stores the other-node-user information DB and node information DB.

The central processing unit 31 includes an acquisition processing unit 31a and a notification processing unit 31b which are processing functions related to this embodiment. The acquisition processing unit 31a, when it receives a connection request from the IP terminal, retrieves the other-node-user information DB using, as a key, the extension number of a request source IP terminal, contained in the connection request, thereby acquiring the ID of the exchange corresponding to this extension number. When the ID has been acquired, the acquisition processing unit 31a retrieves the node information DB using as a key this ID, thereby acquiring the IP address corresponding to this ID.

The notification processing unit 31b provides notification of the IP address acquired by the acquisition processing unit 31a to the request source IP terminal.

Figure 5:
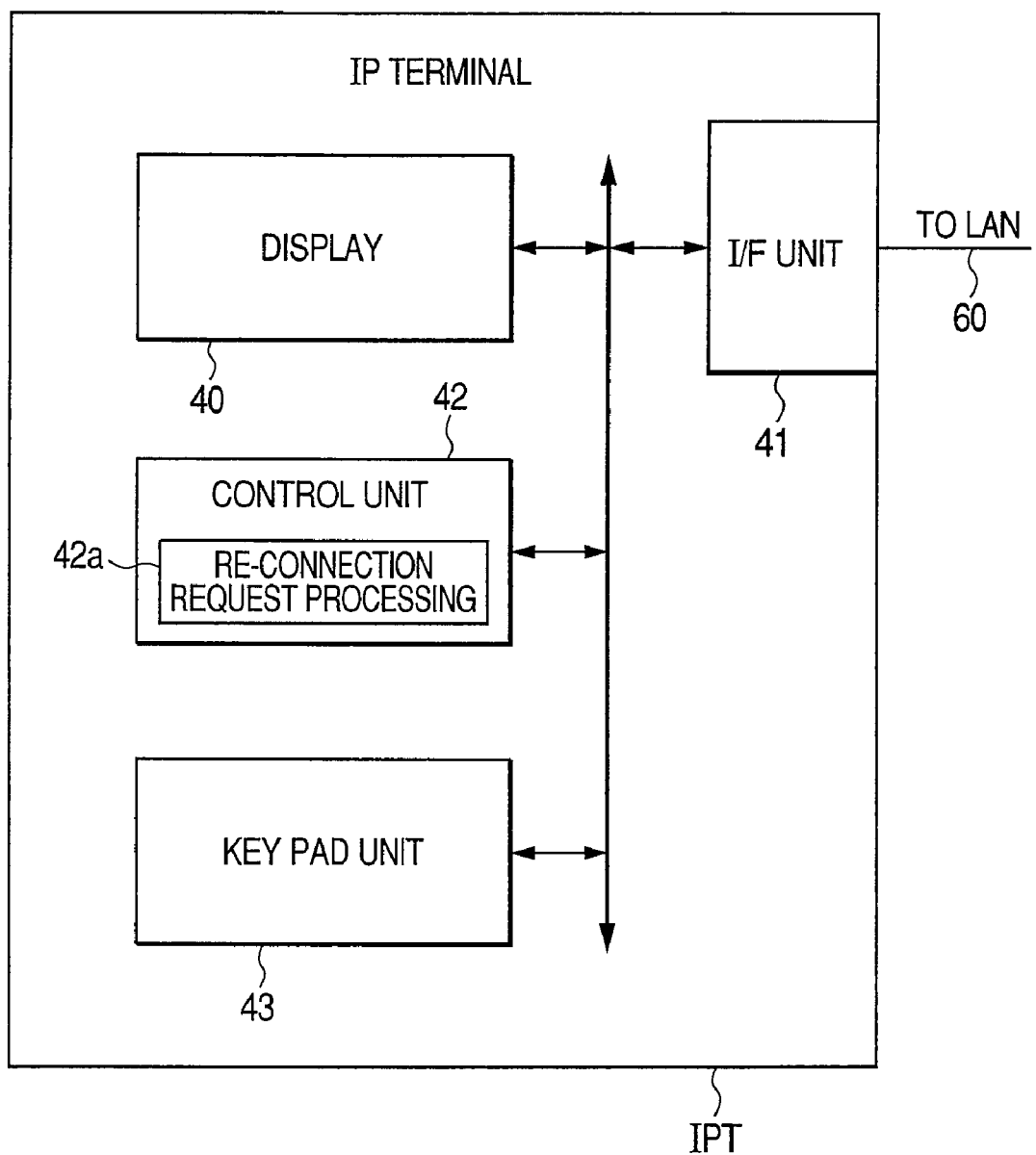
FIG. 5 is an exemplary function block diagram showing the IP terminal (IPT) in FIG. 1.

FIG. 5 is a function block diagram showing the IP terminal (IPT) in FIG. 1. The IPT includes an interface (I/F) unit 41 connected to the LAN through a LAN cable 60, a display 40, a control unit 42 and a key pad unit 43. The display 40 is a LCD (Liquid Crystal Display) which visually displays various messages. The key pad unit 43 includes software keys and numeral keys and receives an inputting operation by a user.

The control unit 42 includes a re-connection request processing unit 42a. The re-connection request processing unit 42a, when it receives notification of the IP address from the exchange, transmits the connection request to this IP address. Namely, the re-connection request processing unit 42a, if it has first accessed the exchange previously set in the IP terminal in the log-in procedure, but has been notified of the IP address of another exchange from this exchange accessed, recognizes that the exchange first accessed is not an original connecting party, and transmits the log-in request again toward the IP address notified.

FIG. 6 is a sequence diagram showing the log-in processing procedure in the above configuration. FIG. 6 illustrates a control method adopted when a user of the IP terminal 100 belonging to the exchange 1 (node 10) employs the IP terminal 200 belonging to the exchange 2 (node 20) as a terminal with the same setting as the IP terminal 100.

By inputting a special number or extension number from the IP terminal 200, the exchange 2 receives a connection request so that a log-in sequence is started. The exchange 2 having received this connection request, when it is notified of the extension number not belonging to the exchange 2, specifies the exchange to which the extension number belongs. Now, since the extension number belonging to the node 10 has been notified, the exchange 2 notifies the IP terminal 200 of the IP address of the exchange 1 (node 10) as a terminal connection response.

The IP terminal 200 having received the terminal connection response transmits a connection request to the exchange 1 (node 10) again on the basis of the IP address of the node 10 received from the exchange 2 (node 20). The exchange 1 having received this connection request, if the extension number notified belongs to its own machine, permits the connection from the IP terminal 200 under the exchange 2. The IP terminal 200 which has been given the permission notifies the exchange 1 of the completion of terminal connection. The exchange 1 having received it permits the log-in.

The presence or absence of authentication by a password depends on the policy of the system. If the inputting of the password is needed, the exchange 1 having received the completion of terminal connection requests the IP terminal 200 to input the password. In response to this, the IP terminal 200 displays urging of inputting the password on the display 40. If inputting the password by the IP terminal 200 is completed, the exchange 1 is notified of the password. The exchange 1 executes the authentication by the password. If the exchange 1 succeeds in the authentication, it permits the log-in of the IP terminal 200.

FIG. 7 is an exemplary flowchart showing the determining procedure of a connection node by the exchange. The exchange having received a terminal connection request acquires the extension number of a request source IP terminal on the basis of the received data (step S1). The exchange compares this extension number with the extension number set in the other-node-user information data base (step S2). If agreement is confirmed, the exchange returns the IP address corresponding to the node ID of the exchange corresponding to the extension number to the request source (step S3). If the agreement is not confirmed, the exchange refuses the terminal connection (step S4).

As described above, in the telephone system according to this embodiment, each of the exchanges is caused to store a node information DB in which each exchange is correlated with the IP address thereof and the other-node-user information DB in which the extension number of the IP terminal is correlated with the identifier of the exchange of a prescribed connection party for the IP terminal. In this telephone system, when a connection request is transmitted from the IP terminal to the exchange, the exchange notifies the request source IP terminal of the IP address of a destination exchange corresponding to the extension number of the request source. The IP terminal the connection having received it transmits connection request to this IP address again.

In this way, since the IP terminal under the management of any node is connected to another node as requested on the basis of the information of the user using this IP terminal, also in the terminal other than his own terminal usually employed by the user, various items of information set in his own terminal can be employed in the other terminal.

For example, where the nodes making communication to one another are prepared for the head office and factories, respectively and the user at the factory has made an official trip to the head office, he can employ the terminal at the head office with the same setting as that at the factory. Further, in this embodiment, without providing the equipment such as a server, the storage device of the exchange can be employed so that the telephone system can be structured at low cost. Even when the user employs his own terminal at the place where he moved, the user is not requested to input the exchange information (node information) and so may not be conscious of the node. Thus, he can easily execute the log-in operation. Accordingly, the telephone system permitting the log-in the system at any place can be provided at low cost.

Additionally, this invention should not be limited to the embodiment described above. For example, as the other-node-user information data base, only a part of the extension numbers may be registered as shown in FIG. 8. In this case, preferably, if the extension number starting at "4" is inputted from the IP terminal, all connection requests may be transmitted to the exchange 1 (node 10); and if the extension number starting at "6" is inputted, all connection requests may be transmitted to the exchange 2 (node 20).

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A telephone system comprising;
a plurality of exchanges interconnecting a plurality of communication terminals to one another through a communication network, each exchange receiving from each communication terminal a connection request that includes an extension number that is assigned to each user, each of the exchanges comprising:
a management database in which the extension number assigned to each user is correlated with an address information of a default exchange that receives a default communication terminal assigned by default to the user;
an acquisition processing unit configured to extract an extension number from the connection request and acquire the address information of the default exchange by accessing the management database with the extension number extracted from the connection request, in response to the connection request received from a specific communication terminal included in the communication terminals; and
a notification processing unit configured to notify the specific communication terminal sending the connection request, the address information of the default exchange acquired by the acquisition processing unit,
wherein each of the communication terminals comprises:
a user interface configured to allow a user to input the extension number assigned to the user;
a connection request processing unit configured to transmit the connection request including the extension number input by the user to one of the exchanges receiving the specific communication terminal; and
a re-connection request processing unit configured to transmit the connection request to the default exchange based on the address information of the prescribed exchange is notified from the exchange notification processing unit in response to the connection request.

2. The telephone system according to claim 1, wherein the default exchange is capable of receiving the connection request from the communication terminal which is physically connected thereto.

3. The telephone system according to claim 1, wherein the management data base includes:
a first database in which the extension number of the communication terminal is correlated with an information of the default exchange, and
a second database in which each exchange is correlated with the address information of each exchange,
wherein the acquisition processing unit retrieves the first database based on the extension number of the communication terminal that requests the connection request and acquires the information of the default exchange corresponding to the extension number assigned to the communication terminal, and
wherein the acquisition processing unit retrieves the second database based on the acquired information of the default exchange and acquires an address information corresponding to the acquired information of the default exchange.

4. The telephone system according to claim 3, wherein the default exchange is capable of receiving the connection request from the communication terminal which is physically connected thereto.

5. The telephone system according to claim 1, wherein the communication network is a private network.

6. The telephone system according to claim 3, wherein the communication network is a private network.

7. The telephone system according to claim 5, wherein the private network is an internet protocol network.

8. The telephone system according to claim 6, wherein the private network is an internet protocol network.

9. A non-transitory computer-readable medium having executable instructions for enabling a computer to interconnect, through a communication network, a plurality of communication terminals to a plurality of exchanges in which each exchange receives from each communication terminal a connection request that includes an extension number of each communication terminal, based on authentication processing, the computer readable medium comprising:
an acquisition processing module configured to retrieve a management database that includes the extension number correlated with an address information of a prescribed exchange, based on the extension number when the connection request is received from the communication terminal and acquiring the address information of the prescribed exchange;
a notification processing module configured to notify the communication terminal of the address information of the prescribed exchange acquired by the acquisition processing unit;
a re-connection request processing module configured to transmit the connection request to the address information of the prescribed exchange when the address information of the prescribed exchange is notified from the exchange; and wherein each of the communication terminals is configured to allow a user to log in with a user's extension number and to transmit the connection request including the user's extension number to a default exchange, the default exchange defined to be one of the plurality of exchanges to which the communication terminal is received.

10. The computer-readable medium according to claim 9, wherein the communication network is a private network not via a public network.

11. The computer-readable medium according to claim 9, wherein the private network is an internet protocol network.

12. A method for controlling a telephone system comprising:
   a plurality of exchanges interconnecting a plurality of communication terminals to one another through a communication network, each exchange receiving from each communication terminal a connection request that includes an extension number that is assigned to each user; and
   a management database in which the extension number assigned to each user is correlated with an address information of a default exchange that receives a default communication terminal assigned by default to the user,
wherein the method comprising:
   extracting and extension number from the connection request;
   acquiring the address information of the default exchange by accessing the management database with the extension number extracted from the connection request, in response to the connection request received from a specific communication terminal included in the communication terminals;
   notifying, to the specific communication terminal, the address information of the default exchange;
   allowing a user to input the extension number assigned to the user and to the default communication terminal;
   transmitting the connection request including the extension number input by the user to one of the exchanges receiving the specific communication terminal; and
   transmitting the connection request to the default exchange based on the address information of the default exchange being notified in response to the connection request.

\* \* \* \* \*